May 18, 1965 G. E. RYCKMAN 3,184,324
METHOD OF APPLYING GRANULES AND APPARATUS FOR DOING THE SAME
Filed Nov. 22, 1960 13 Sheets-Sheet 2

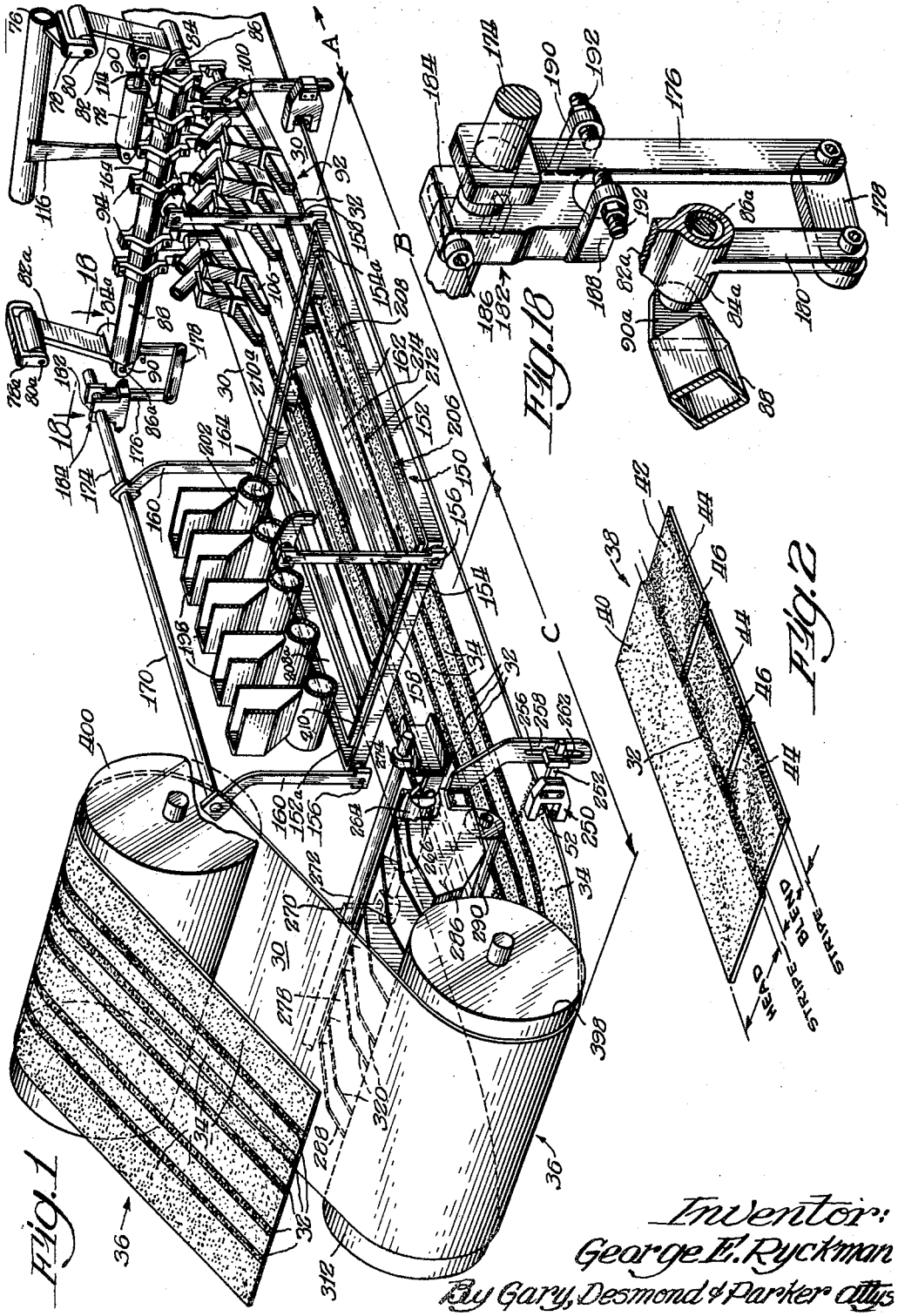

Inventor:
George E. Ryckman
By
Gary, Desmond & Parker
Attys

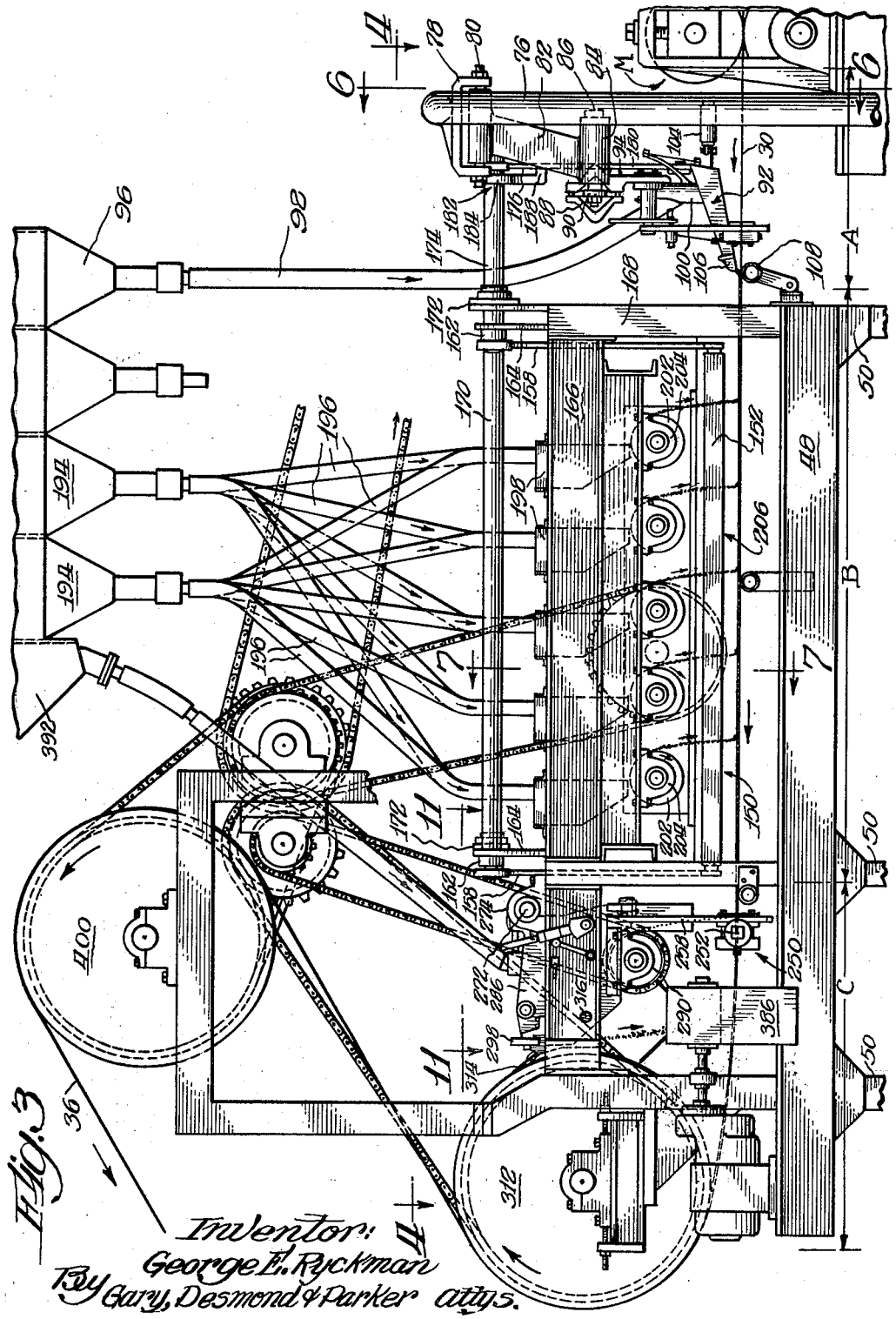

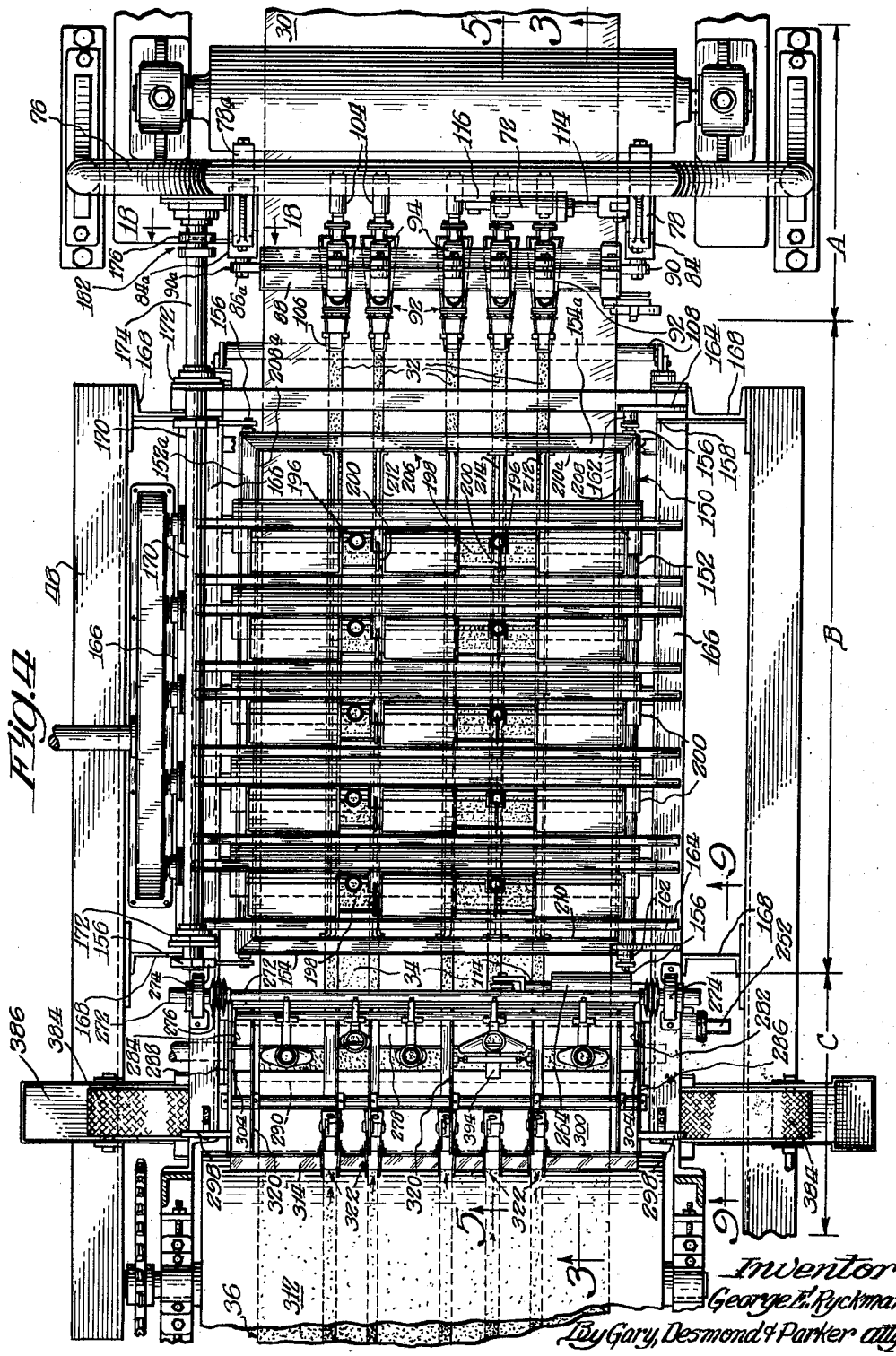

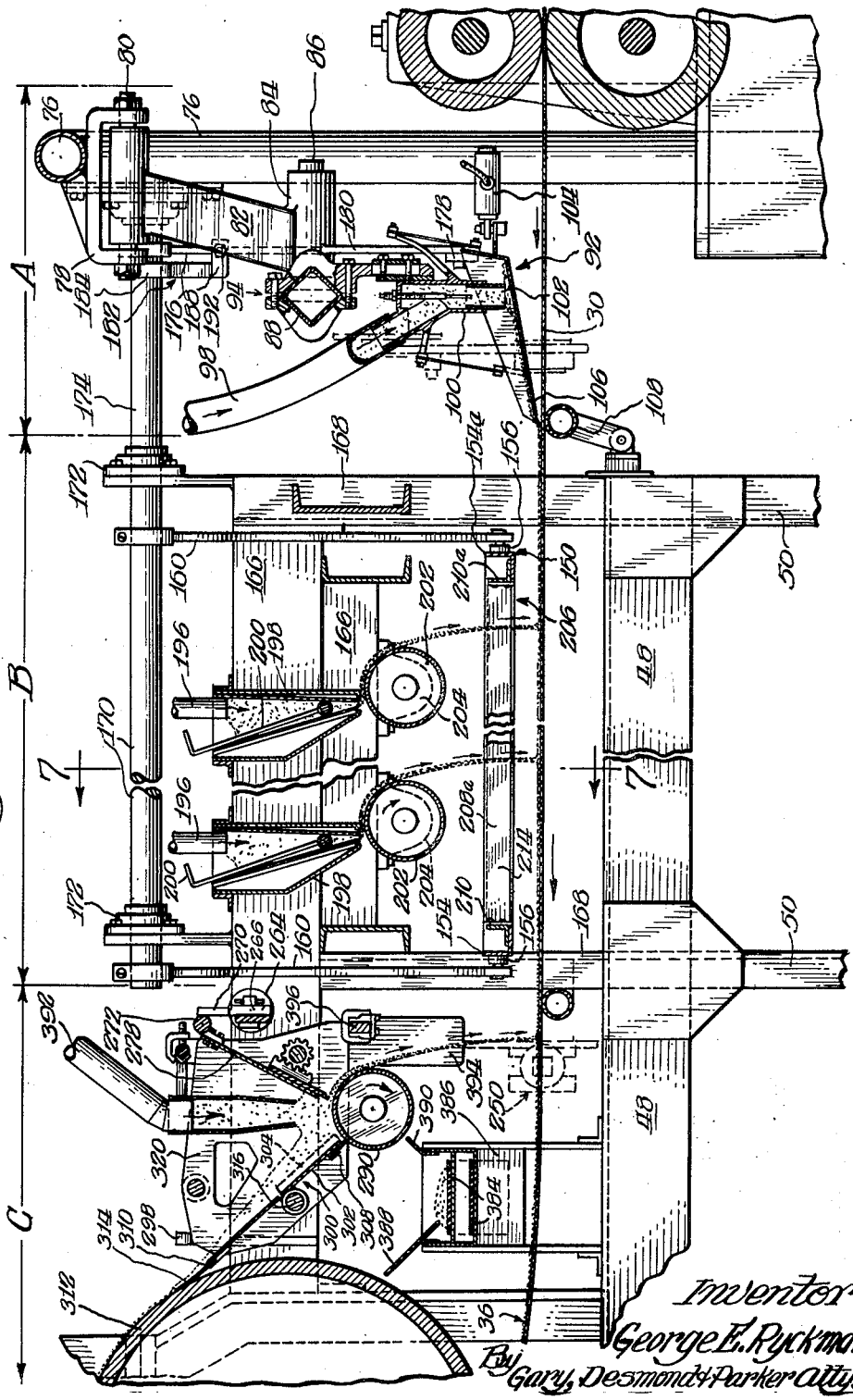

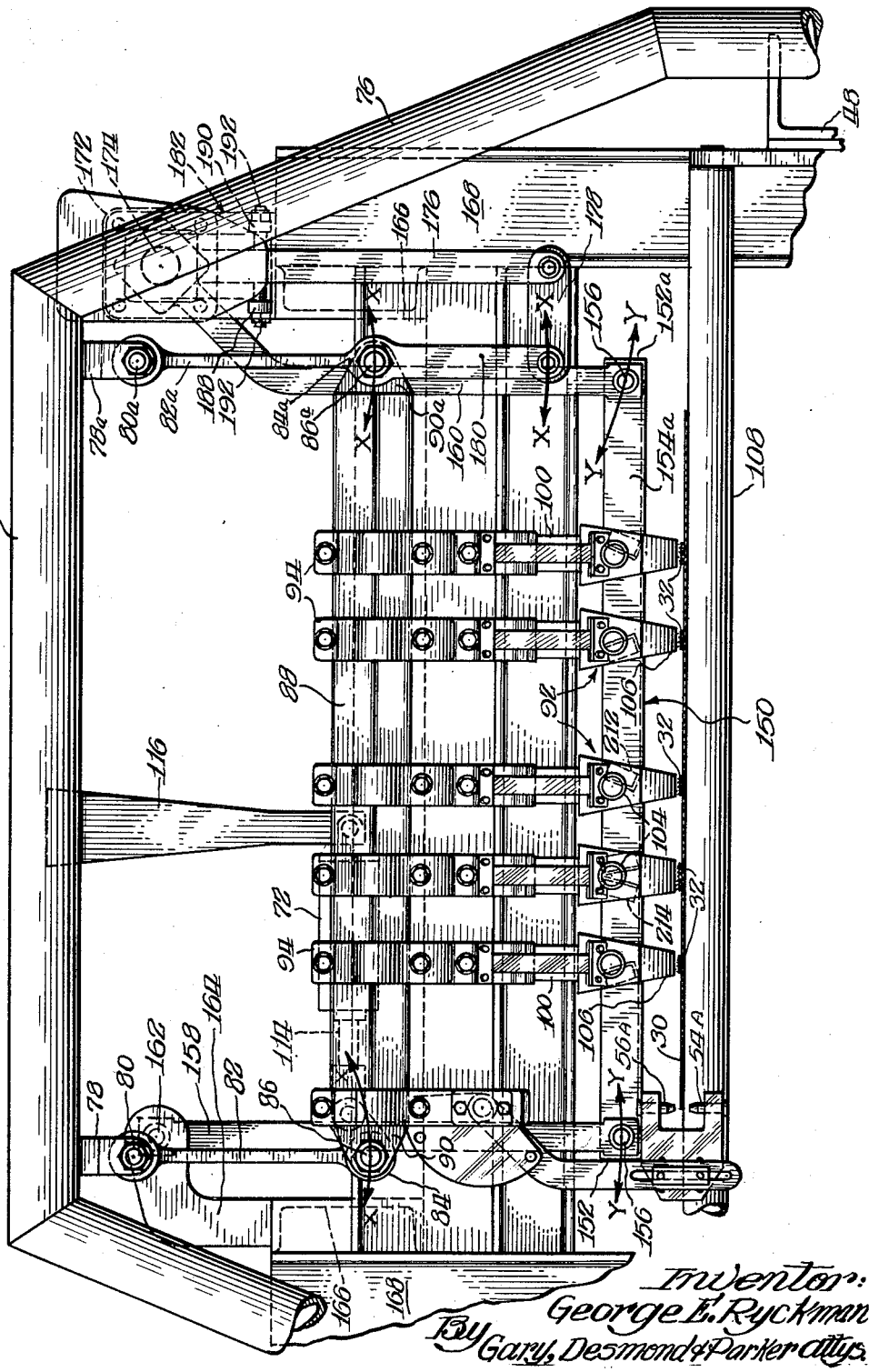

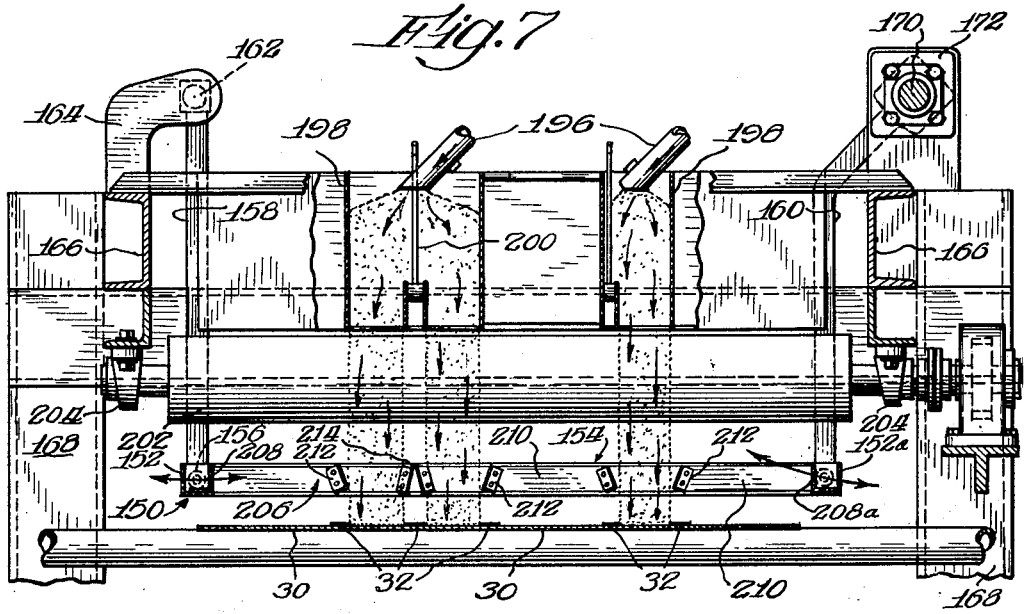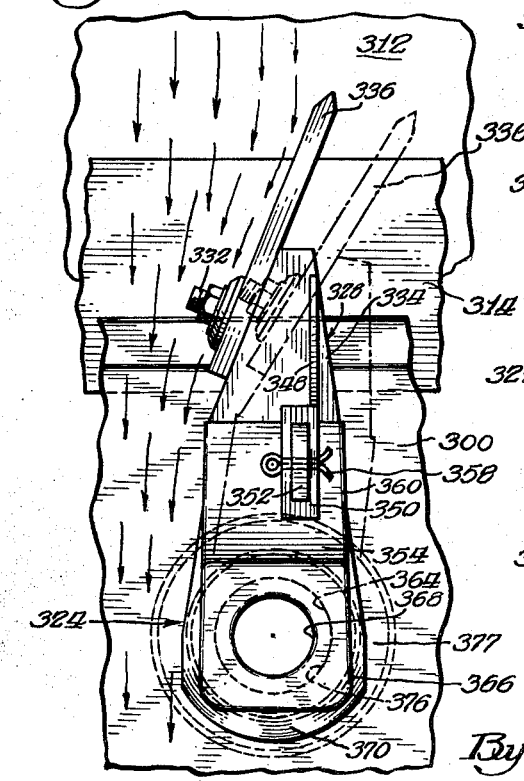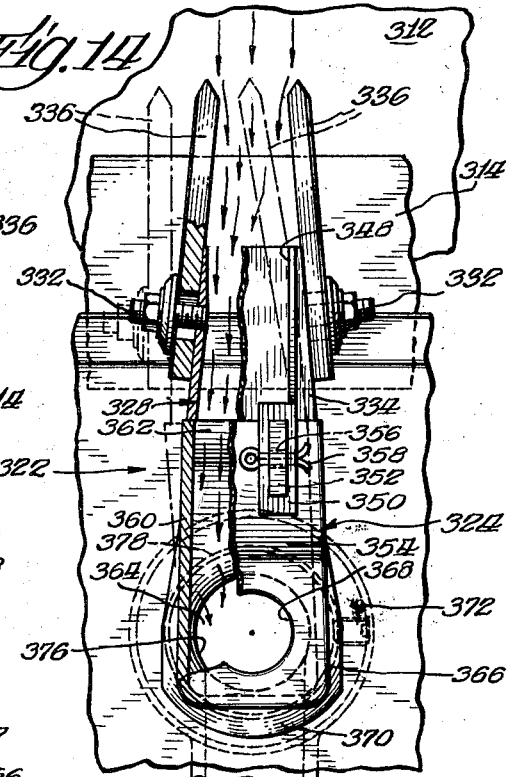

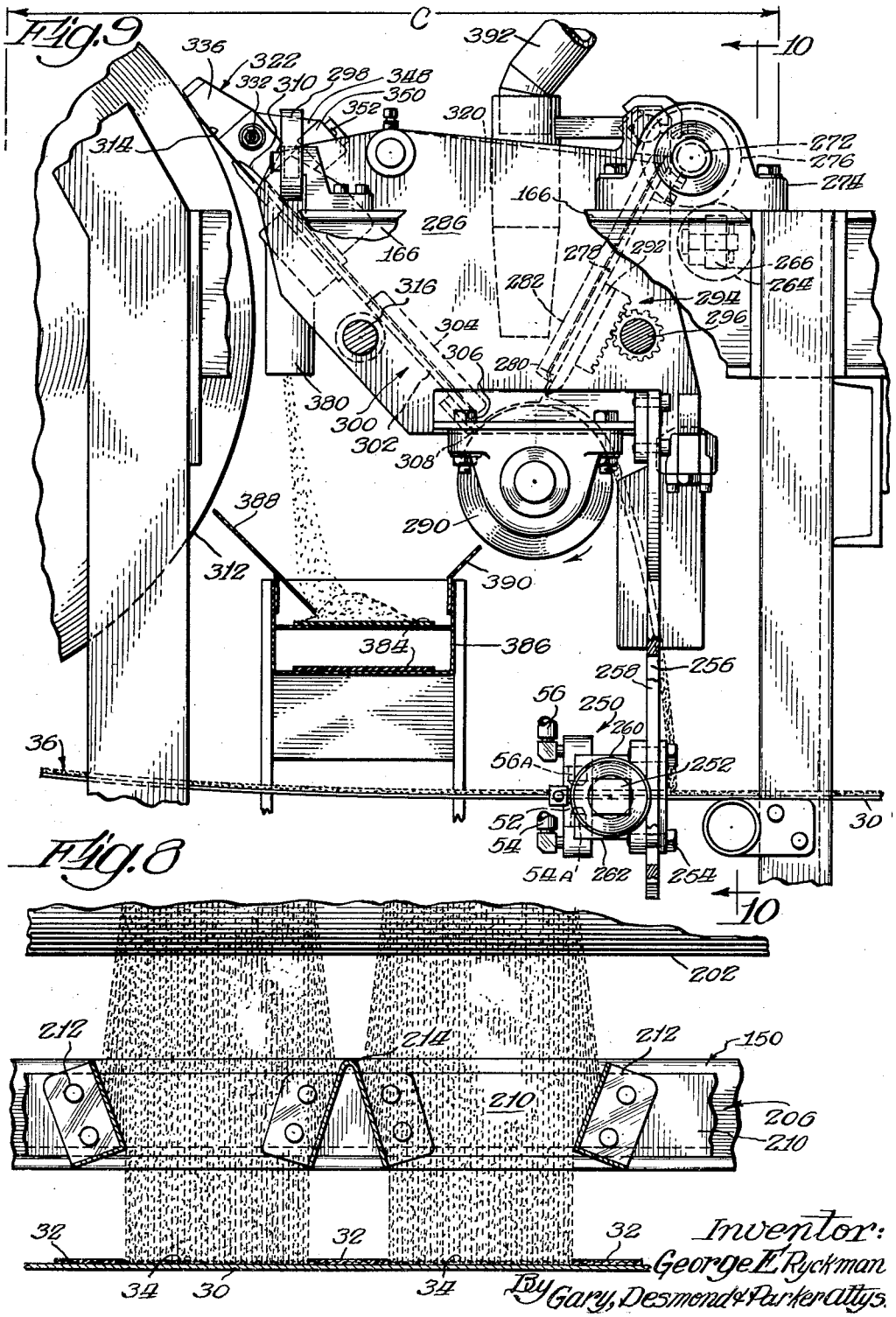

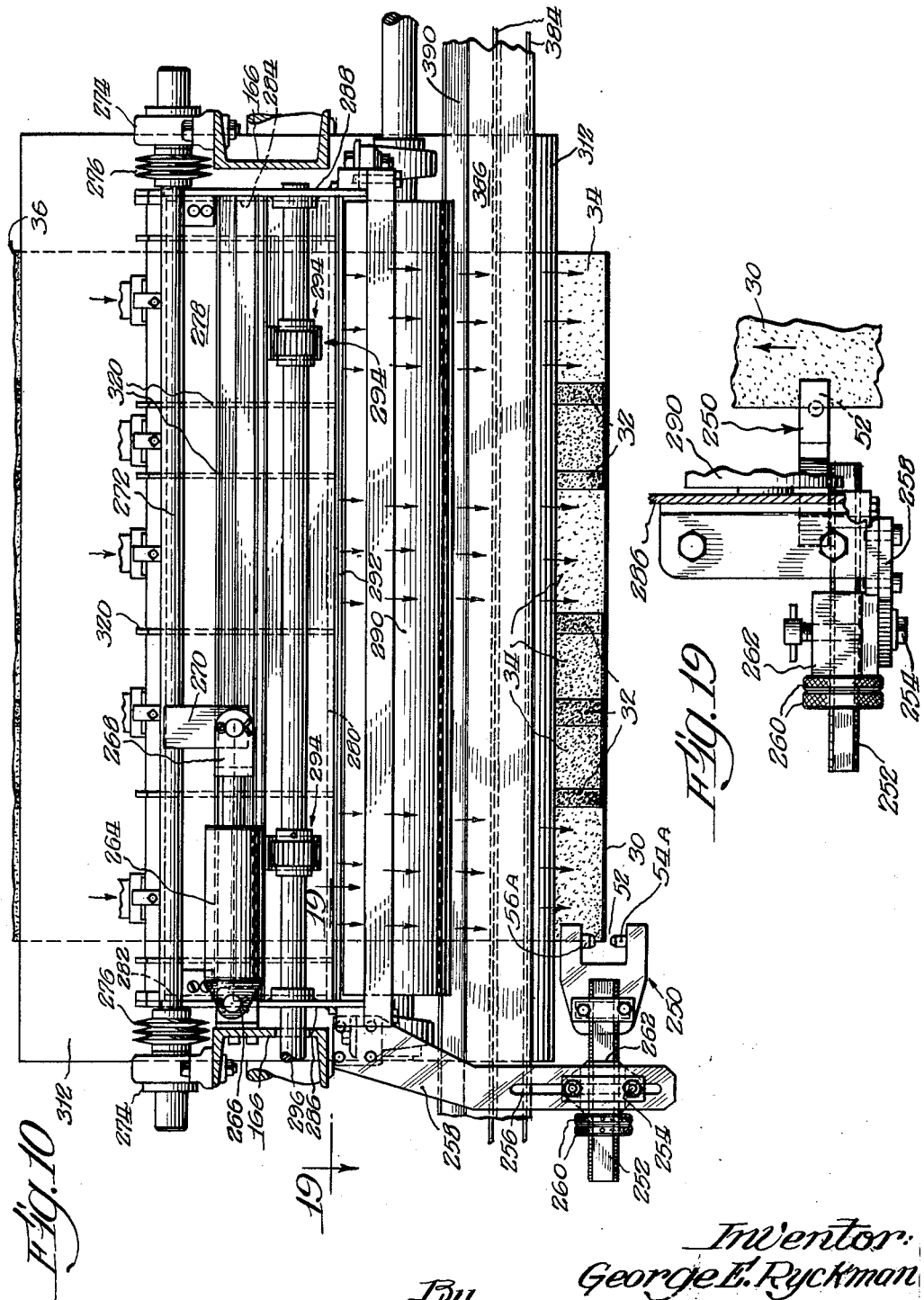

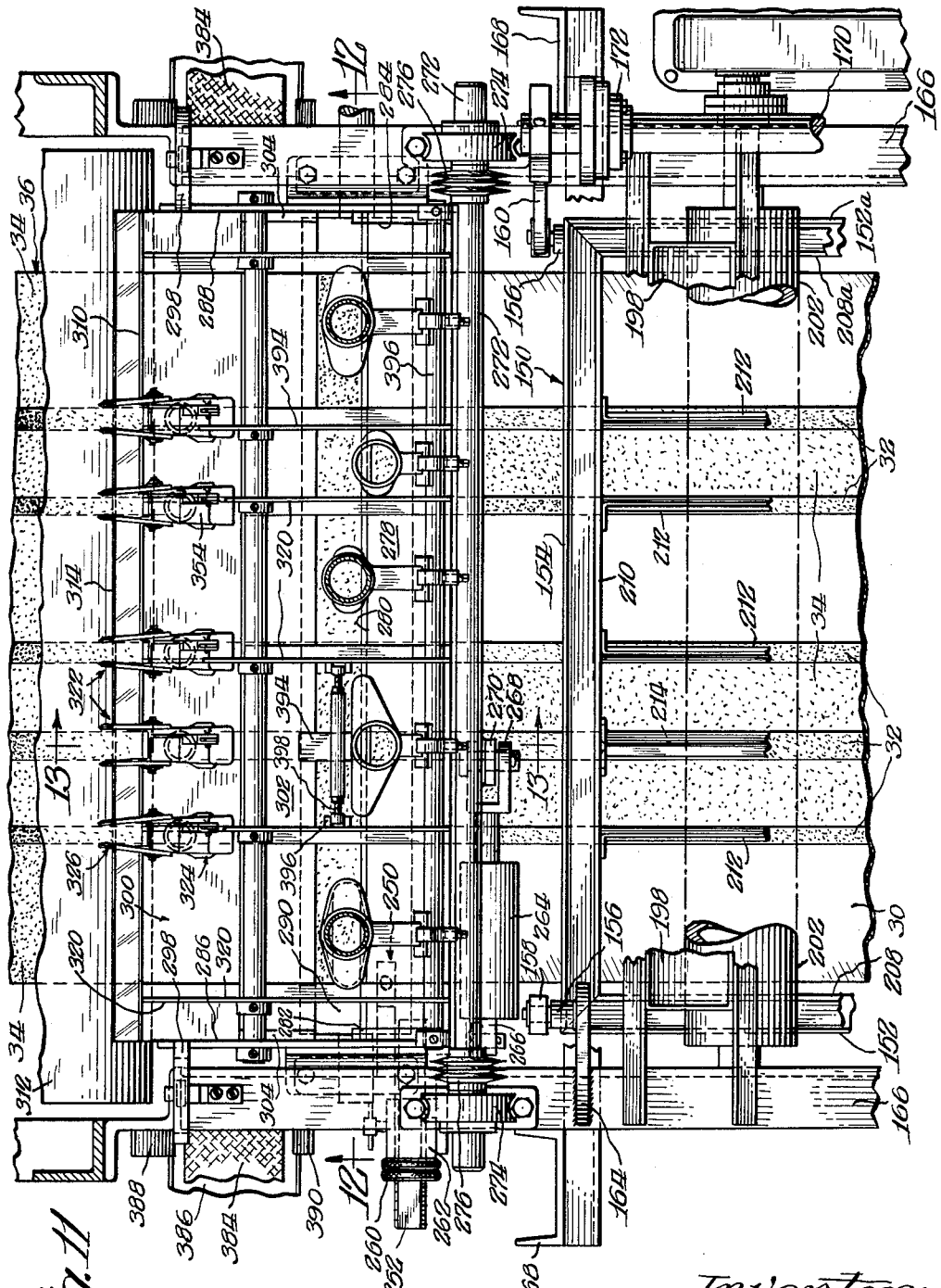

May 18, 1965   G. E. RYCKMAN   3,184,324
METHOD OF APPLYING GRANULES AND APPARATUS FOR DOING THE SAME
Filed Nov. 22, 1960   13 Sheets-Sheet 11
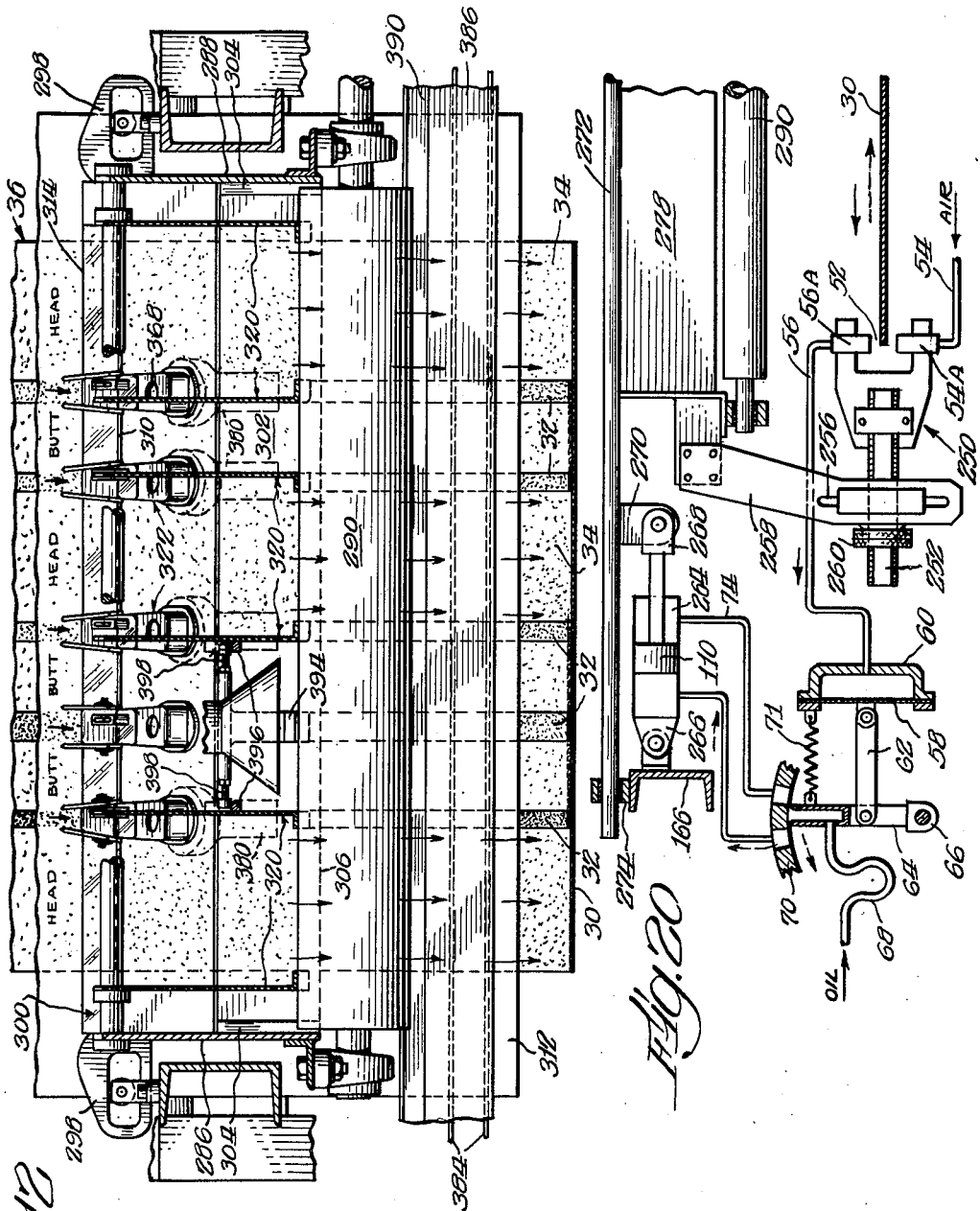
Inventor:
George E. Ryckman
By Gary, Desmond & Parker Attys.

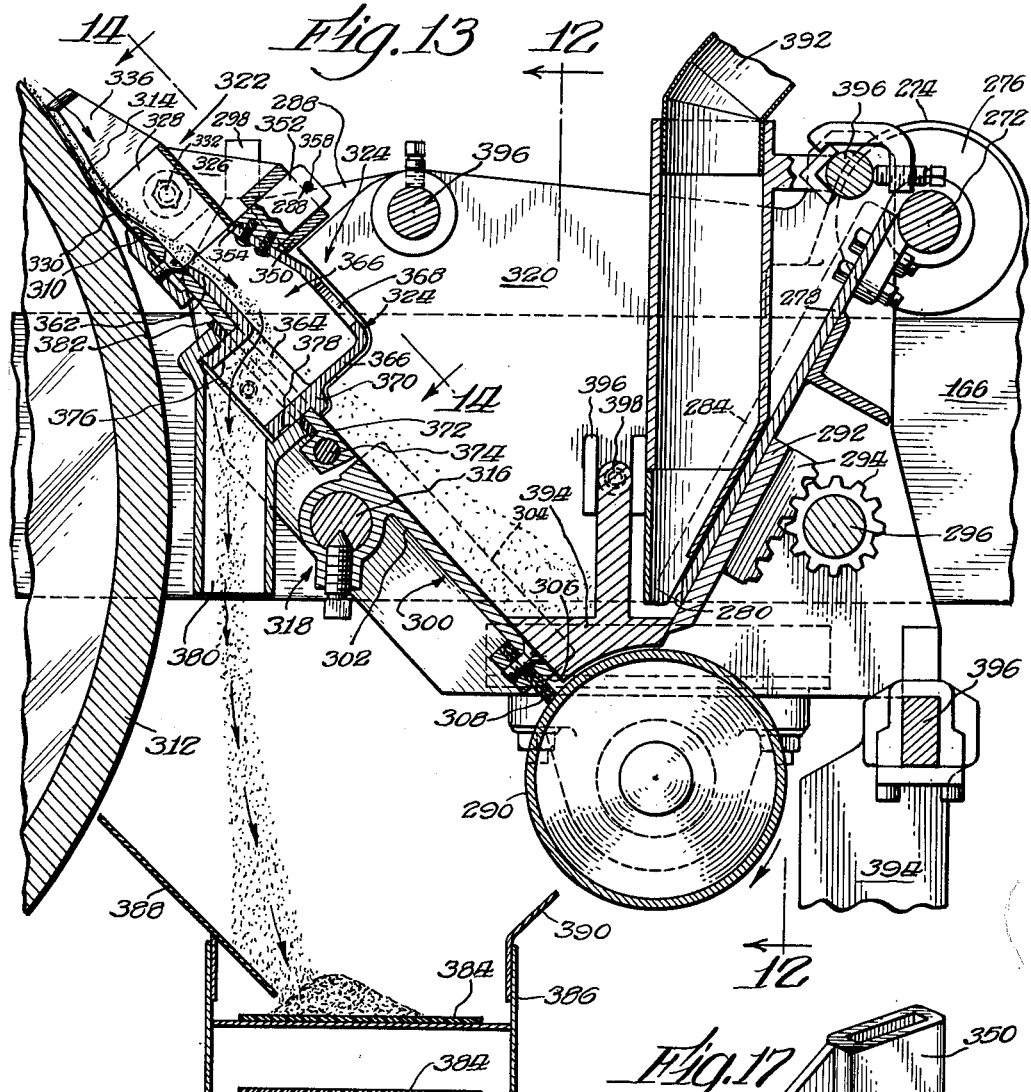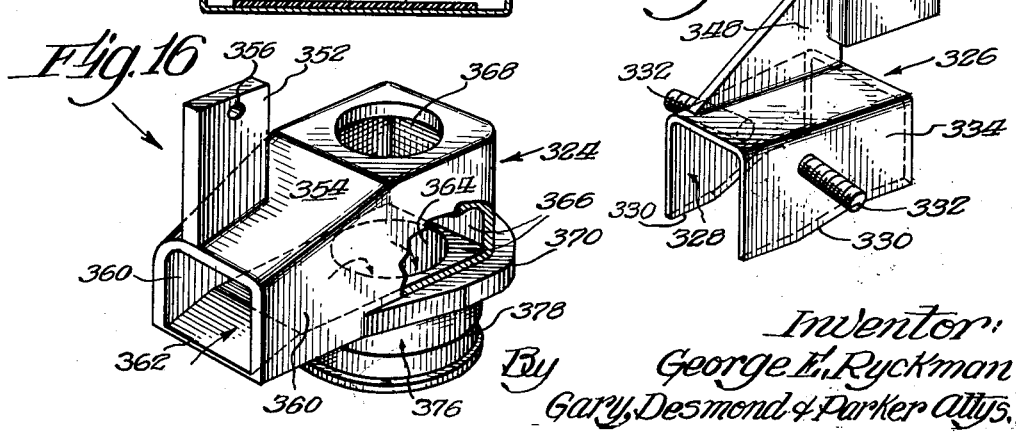

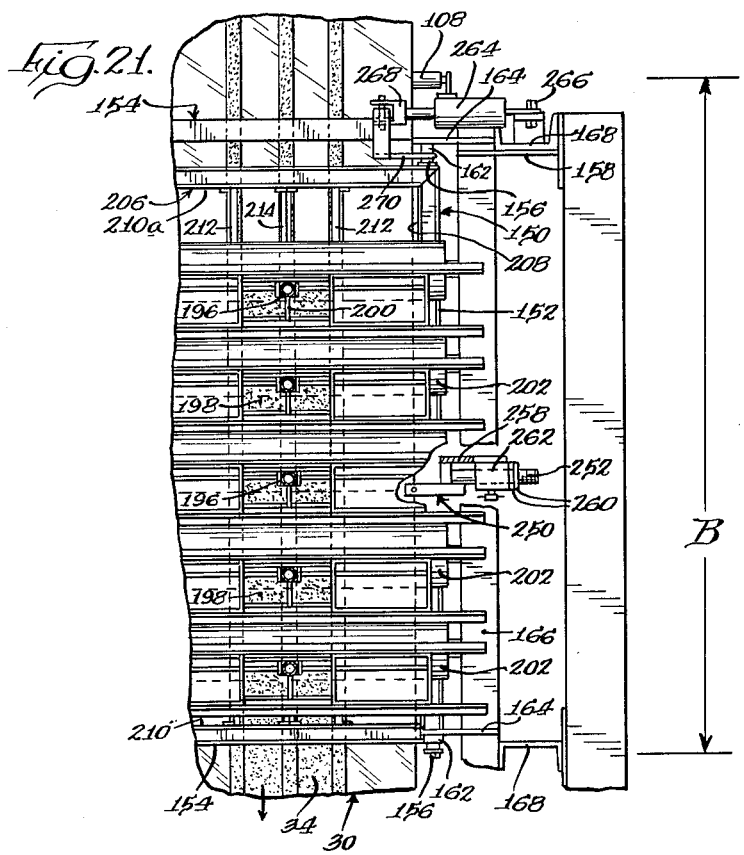

United States Patent Office 3,184,324
Patented May 18, 1965

3,184,324
METHOD OF APPLYING GRANULES AND
APPARATUS FOR DOING THE SAME
George Edward Ryckman, East Liverpool, Ohio, assignor to T-K Roofing Manufacturing Co., Chester, W. Va., a corporation of West Virginia
Filed Nov. 22, 1960, Ser. No. 71,019
9 Claims. (Cl. 117—19)

This invention is directed to the art of making roof-protective coverings in the form of shingles. More specifically it is directed to the process and apparatus by which the process is carried out for producing an improved shingle having unusually accurately blended color combinations of lines and shadow effects in which the color zones are sharply defined.

Conventionally, asphalt shingles are produced in a continuous manner. A suitable fibrous web composed of a desired furnish, in which the various components are properly blended to provide the desired degree of saturation, is generally used as a base or foundation upon which the other materials are deposited and supported. To provide suitable waterproofness, the fibrous web, as a continuous sheet, is passed through a vat containing the asphalt saturant and is retained within the said asphalt saturant for a sufficient length of time to become impregnated with the desired amount of saturant. The saturated web is looped in festoon-type of cooler to permit the saturant to congeal and also to prevent sticking of the web in the event it is desired to form rolls.

The saturated web or felt is next passed through a coating applicator which passes a sufficient amount of an asphalt coating material on both sides of the saturated felt but preferably with a larger amount on the top surface. Immediately thereafter granules of the desired color and size are placed on the hot, tacky asphalt coating material. These are pressed by means of rolls into intimate contact with the said tacky asphalt coating to provide bond and improve adherence of the granules to the web. The embedded granules may be placed in any pattern or combination of colors to achieve the final design as to configuration or pattern that is desired. The cooled granule-covered web is cut into a preselected pattern to form the tabs and slots of the shingles to be used as a roof covering.

As mentioned above, the granules that are applied to the coating come in various straight colors or blends thereof to achieve the desired effect as a roof covering material. Likewise, the head lap or the portion which is covered by the overlying strip shingle, may have one color, while the butt portion may have another color. In order to obtain certain shadow effects and to accentuate the edges of the strip shingles, the edge portion of the butt may have a stripe of a somewhat darker or lighter blend of color than that on the principal surface area exposed to the eyes of a viewer. In addition, to further accentuate this three-dimensional or shadow effect so as to provide the illusion of a very thick edge on the butt portion, that portion of the area immediately adjacent the butt edge or immediately below the butt edge on the head lap of the shingle in the underlying course, may also be striped with contrasting colored granules or blends of a darker or lighter color.

However, in present practice, the continuous web as it progresses through various stages of the process, becomes distorted either longitudinally or transversely because of uneven expansion and contraction, stretch, unequal pull by the driver rolls or other conditions inherent in the operations. As a result of this distortion as well as the well known belt effect present in the web there is a tendency to weave from side-to-side as the web moves through the machine. Accordingly, when the coating asphalt is applied to the saturated web and the colored granules are embedded in the coating, there is a marked distortion, unevenness and lack of linearity as well as loss of parallelism between the various edges of the cutout slots, butts and head laps. This lack of register causes considerable waste and results in large quantities of seconds. These shingles though structurally sound are not acceptable to the buyer who wants uniformity in texture, color and appearance. Accordingly, variation in location and widths of these strips make a very unsightly roof unacceptable to the consumer.

It therefore is an object of my invention to provide a process for accurately depositing coating and granules in proper registry to obtain sharp delineation of the various color mass areas and to emphasize the illusion of depth.

A further object of my invention is to provide a process for controlling the deposition of materials at the preselected place upon a weaving and wavering but continuously moving web of fibrous sheeting.

A still further object of my invention is to provide a process whereby colored granules can be deposited in any desired sequence of colors to provide a three-dimensional effect that is realistic, and provides sharp parallel lines with the cut edges of the butt portion of the shingle.

Another object of my invention is to provide an apparatus which is controlled by the position of the web whereby the exact lines of color demarcation are sharply and accurately delineated to give the enhanced effect of a three-dimensional thickened butt edge.

Still another object of my invention is to provide a device which will lay down a straight line longitudinally in exact register and parallelism with one to another or to the longitudinal edge of the web.

These and other adaptations, modifications, variations and extensions will become quite obvious to one skilled in this art particularly in view of the clear and definitive description given hereinbelow of my invention, which is further illustrated in the annexed drawings forming a part of this disclosure.

In the drawings:

FIGURE 1A is a schematic side elevational view of conventional web feeding, saturating and coating equipment that precedes the granule depositing means of the present invention, and that conditions the web for application thereto of the granules.

FIGURE 1 is a partially broken away perspective view, showing the arrangement of the fundamental elements of the combination in my invention.

FIGURE 2 is a perspective view of a shingle, a type that is readily and accurately reproducable with my improved machine.

FIGURE 3 is a side elevational view taken along line 3—3 of FIGURE 4.

FIGURE 5 is an elevational section partially enlarged and broken away taken along line 5—5 of FIGURE 4.

FIGURE 6 is an end view taken along line 6—6 of FIGURE 3.

FIGURE 7 is an enlarged transverse section partly broken away taken along line 7—7 of FIGURE 3.

FIGURE 8 is an enlarged view partly broken away of the baffle arrangement shown in FIGURE 7.

FIGURE 9 is an enlarged view of the spill-recovery hopper with the framing supports partly broken away taken along line 9—9 of FIGURE 4.

FIGURE 10 is a section taken along line 10—10 of FIGURE 9.

FIGURE 11 is a partially enlarged plan view taken along line 11—11 of FIGURE 3.

FIGURE 12 is a section with parts broken away taken substantially along lines 12—12 of FIGURES 11 and 13.

FIGURE 13 is an enlarged section taken along line 13—13 of FIGURE 11.

FIGURE 14 is a detailed view of a double side granule-recovery assembly as shown in FIGURE 11 and taken along line 14—14 of FIGURE 13.

FIGURE 15 is a detailed view of a modification showing a single side granule-deflector assembly.

FIGURE 16 is a partially broken away perspective view of the granule-recovery chute section.

FIGURE 17 is a perspective view of the granule guide forming a part of the granule-recovery assembly.

FIGURE 18 is a view in perspective of the adjustable linkage coupling taken along line 18—18 of FIGURE 1.

FIGURE 19 is a view taken along line 19—19 of FIGURE 10.

FIGURE 20 is a schematic diagram of web-controlled guide for positioning the machine in register.

FIGURE 21 is a fragmentary plan view of a modified assembly B with an individual edge indexing unit and power unit responding to said unit and capable of acting as a completely self-sufficient assembly for application of material to the surface of a moving web.

In the illustrations, numerical characters are employed to point out with particularity the elements and their combinations and these same characters are employed hereinbelow for the identical purpose.

Figure 4H:
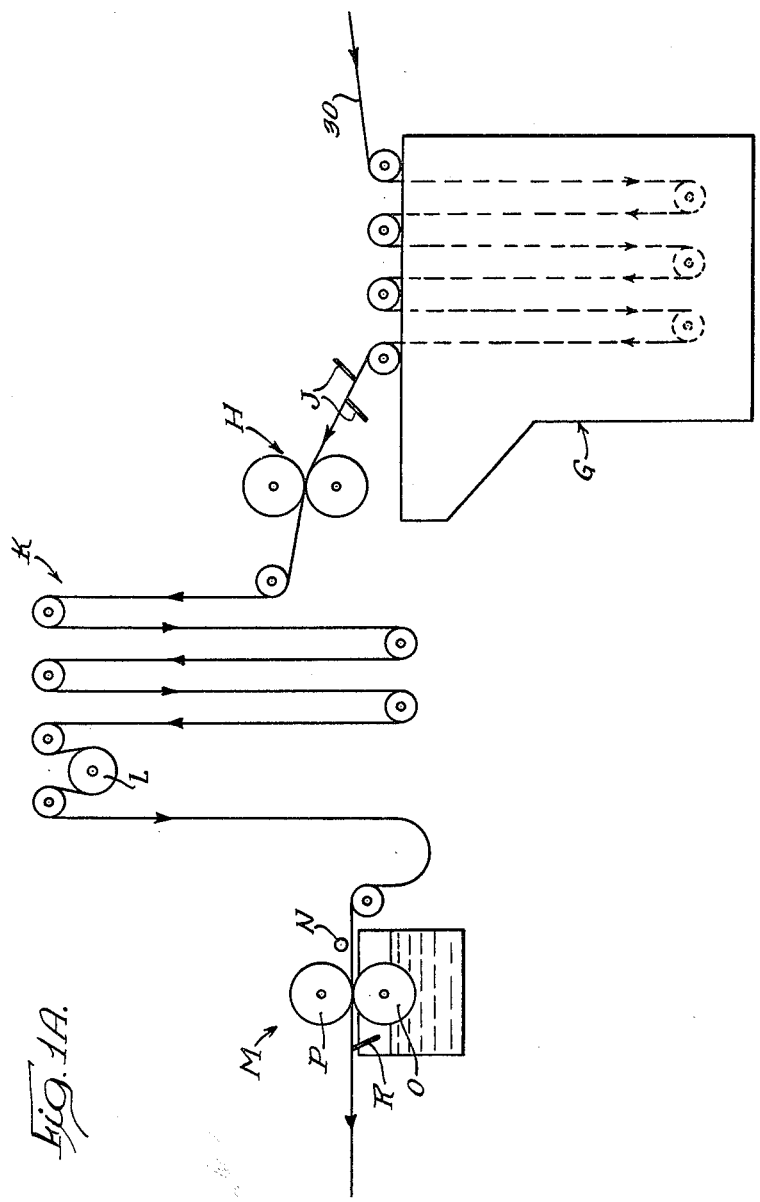
FIGURE 4 is a view taken along line 4—4 of FIGURE 3.

Essentially, my invention comprises three assemblies acting in concert to produce the product. Assembly A (in FIGURE 1) comprises a means for applying an excess of granules in the predetermined and selected narrow paths or bands which are in precise parallel relationship to the edge of an asphalt coated web, and a control means governed by the edge of the web that guides the formation of said narrow band. Assembly B is a means for applying granules to the portions of coated web other than those already covered by means of assembly A. To provide complete coverage of the asphalt coated web, a certain amount of overlapping is necessary between the bands of granules. Assembly C completes the deposition of granules to the uncovered portions of the web. It also is a means to recover the excess of granules and directs each type of granule into separate hoppers by means of directional chutes guided by the edge of the web.

Thus the asphalt coated web is first covered with specific bands of an excess of colored granules having definite width and spacing in precise parallelism with the edge of the web, then the intermediate but uncovered-by-granules portions of the asphalt coated web are covered precisely with an excess of granules of another kind or color, and after embedment by a roll, the excess of each kind or colored granule is recovered by means of swingable chutes controlled by the web edge that discharge the recovered granules into their respective hoppers.

Referring in detail to the drawings, and with particular reference to FIGURES 1A, 1 and 2 thereof, the web 30 conventionally is a continuous fibrous sheet consisting of various rag and cellulosic fibrous components in such proportions as needed to produce a web or felt having desired tensile strength and saturation characteristics.

The dry felt or web is drawn continuously through a saturator G filled with hot asphaltic saturant, pulling force being provided by draw rolls H. The saturator illustrated is an immersion type including rolls guiding the web in a plurality of passes therethrough to insure impregnation of the web with the desired amount of saturant. Opposed scrapers J remove excess saturant from both sides of the web as it leaves the saturator G, and the saturated web is then looped through a festoon type of cooler or strike-in section K to permit the saturant to congeal, the web being pulled through the cooler by draw roll L.

The saturated web or felt is next passed through a coating applicator M wherein hot asphalt coating is applied continuously to the upper surface of the web by a flow pipe and header assembly N and to the lower surface of the web by a dip roll O, the latter dipping into a tank that receives excess coating flowing from the upper surface over the sides of the web. The thickness of the upper surface coating is controlled by a doctor roll P overlying the dip roll O, and the thickness of the lower surface coating is controlled by a doctor blade R discharging excess coating into the dip tank.

From the coater M, the web passes continuously and directly into the granule applicator section A (see FIGURE 3) for sequential passage through sections A, B and C illustrated in FIGURES 1 and 3.

The coated web, which is in a tacky condition is adaptable to receive the stripe effect 32, and after being covered with granules 34 for the field the completely granule covered sheet 36 is ready for the conventional slitting and slotting operations to form a shingle 38 (FIGURE 2).

The shingle 38 has a head lap 40 when in actual use is covered by the butt portion 42 of the shingle in the overlying course. The butt portion 42 normally may be divided into several tab or shingle portions 44 by means of cutouts or slots 46, that extend normally perpendicularly from the longitudinal edge of the butt 42 to the approximate medial portion of the shingle 38. Normally the head and butt portions of the shingle have differing colors and sometimes varieties of granules. The highly colored and sharp contrast type used on the butt portion 42 is generally more costly than those used on the head lap portion 40, which in normal use are substantially covered by the head lap portion of the shingle. To obtain a sharp delineation at the boundary of the head lap and butt of the shingle and to obtain a certain illusory effect of thickness and depth on the roof, a stripe 32 of different shade colored granules is applied to the web 30. This stripe 32 must always remain a constant spaced parallel relationship to the edge of the butt portion 42 so that the inner and upper end of the slot 46 will terminate within the stripe area 32. The accentuation and illusory effect of depth and thickness is further emphasized by placing a band of similarly colored granules on that portion of the web 30, which will become, upon cutting, the edge of the butt portion 42 of the shingle 38. Thus, the same or other colored granules may be used to delineate the boundary between the head lap 40 and the butt 42 portions. When placed in overlying courses of shingles in a typical roof shingle construction, these have a cumulative additive to produce a three-dimensional illusion of unusual thickness.

It is obvious from the foregoing considerations that any vagaries in placement of the desired colored granule stripes 32 on the web will become quite apparent since the illusion of thickness of the butt edge when viewed from a distance will be destroyed or considerably impaired.

It should be noted that the numerals employed herein in connection with the web and the shingle or components thereof, are used interchangeably and may refer either to the granules or to the supporting area therefor.

In the course of running the web through a granule applicator, the hot saturated and coated sheet is constantly undergoing a series of changes in transverse, longitudinal and vertical dimensions. There are contraction and expansion characteristics present, as well as unevenness of the pull between the nip of the driver rolls that act on the web. As a result of such differences dimensionally, the web either in the coated or granule covered condition weaves laterally. Consequently the driver rollers cause an uneven pull on the web and shift its position as it passes through the machine. Likewise webs in a saturated condition differ in running characteristics from an asphalt coated or granule covered sheet. In addition, each type of web may differ in its characteristics from one portion to another. Accordingly, this invention is based on the utilization of a sensing device that accurately controls the positioning of either granule-discharging or granule-recovery devices in relationship to the edge of the web.

The machine comprises a suitable support or framing 48 that rests upon columns 50 of suitable design. The individual assemblies A, B and C may be preferably mounted upon individual stands to provide for flexibility and mobility in maintenance, yet all units can be mounted on a single framing structure if desired.

For convenience and clarity in this disclosure the sensing unit and its accompanying pneumatic and hydraulic circuitry will be described first and then it will be followed by its application to assemblies A, B and C which in combination with all elements produces an accurately delineated simulated thick butt shingle.

*The sensing unit*

The sensing unit determines at any instant of time the exact position of the edge of the web and synchronizes the position of the granule-applying and granule-recovery sections with the position of the web.

The edge sensing units may employ different principles, but the one that is preferred is based on a combination of pneumatic and hydraulic elements. It is outlined in FIGURE 20.

The edge of the web 30, either with or without any granules thereon floats within an opening 52 upon a stream of air supplied by tube 54 from a source of constant pressure (not shown). Two openings or orifices 54A and 56A aligned in coaxial relationship span the opening 52. The constant-pressure air is emitted from orifice 54A and in the absence of any obstruction in its path, will impinge upon the orifice 56A. The air in the tube 56 will be compressed somewhat by the air stream impinging the orifice 56A, and in turn will act upon the diaphragm 58 forming the flexible wall of the pressure chamber 60. With variations in air pressure within the chamber 60, the diaphragm 58 bows in or out and causes a movement of the pivotable link 62. The other end of the link 62 is connected to a tube 64, mounted in a pivotable relationship on bearing 66. A flexible tube 68 supplies oil under pressure to the distributor 70, which permits the oil under pressure to enter either end of the hydraulic cylinder 72 by means of the tubing 74. Under the influence of pressure in the cylinder 72 eventually the entire assembly is moved by the piston 110 to the desired position.

In balanced condition of operation the edge of the web 30 is within the opening 52 between the orifices 54A and 56A with the edge of the said web positioned so as to interrupt and deflect one-half of the energy of the air stream impinging on orifice 56A. The resulting above-atmosphere pressure, tending to bulge diaphragm 58 outwardly, is exactly counterbalanced by adjustment of tension spring 71. In this position the tube 64 will be also in a neutral position and no oil can flow. Thus the hydraulic cylinder piston 110 will remain motionless. However, in the event the sheet 30 should move away laterally from the sensing head, more air will be permitted to exert pressure on the diaphragm, bulging it outwardly, and causing the pivoted oil tube supply arm 64 to swing outwardly and permit entry of oil under pressure into cylinder to move the cylinder piston 110 in the direction toward the web. The piston rod 114 attached to the carrier frame moves the entire frame carrying the assembly A to remain in register and desired synchronizing with the edge of the web 30.

With any slight change in the position of the edge of the web, a corresponding change is effected by the piston in the hydraulic cylinder, which will consequently position the carrier. Therefore any sidewise weaving or movement of the continuous web or sheet 30 will also move the spouts dropping the granules to form stripes or bands which will be in exact parallelism with the edge of the sheet. When the fully granule covered sheet is cut into shingles, the edges of the butts and any stripes will be in exact parallel alignment with each other as well as with the edges of the web 30.

It should be noted that one sensing head or unit may be employed to govern the position of the assembly such as A. However, if desired, two or more assemblies may be tied in together in tandem to act in concert whenever any variations in the edge position between the assemblies in the unit may occur. Moreover, in this application because of the distance between assemblies, it is preferred to have one sensing unit control the movement of the assemblies A and B which deposit granules in preselected linear pattern on the web and thereafter have an independent sensing unit governing the lateral motion of the assembly C which is a granule-depositing, recovery and separating mechanism.

*The stripe-applying mechanism*

Essentially the stripe-applying mechanism comprises a rigid granule-dispensing nozzle carrier which is laterally pivotably suspended from a supporting frame. One end of a hydraulic positioning cylinder is attached pivotably to the supporting frame and the other is attached pivotably to the carrier, whereby the position of the carrier over the web may be shifted laterally in unison with movement of the web.

The supporting frame 76 (see FIGURE 6) is of a general inverted U-shaped type which can be a tubular construction as illustrated or of the conventional H- or L-channel structure. It is supported upon a solid bed of concrete or other firm foundation. Depending from the transverse member of the supporting frame 76 are two inverted U-shaped bearing holders 78. Within the legs of each of said holders 78 suitable holes are provided to receive therethrough a shaft 80 from which hangs pivotably a carrier frame-supporting arm 82. The shaft 80 is secured in position about the legs of said holders 78 by any conventional means which as illustrated for instance by means of nuts locked into position so that the carrier frame supporting arm 82 can be easily removed if necessary. The carrier supporting arm 82 at its upper end is journaled about the shaft 80 and extends angularly in spaced parallelism with its counterpart 82a mounted dependently from its corresponding shaft 80a. The lower end of said carrier arm 82 terminates in a journal 84 within which turns spindle 86.

A transversely disposed, preferably square slide bar or tubing 88 is supported at the ends thereof by means of lugs 90 and 90a which have therein openings that journal on the shafts 86 and 86a respectively positioned within the lower journals 84 and 84a. The modifications illustrated are two V-bars placed together to form a square tube. This transverse bar 88 carries a series of granule stripe-forming nozzle assemblies 92 of a conventional design which need not be described in detail. The stripe-forming nozzles 92 are adjustably attached by means of bracket assemblies 94 to the slide bar 88 at preselected positions to obtain the proper spacing of stripes of applied granules. Though the preferred modification is illustrated, it is evident that various other types such as friction-clamp, snap-on holders, etc., can be readily substituted.

As shown in FIGURES 1, 3, 4, 5, 6 and others, the stripe granules 32 are fed from an overhead reservoir 96 by means of a flexible tube 98 to the dispensing hopper 100. A vertically adjustable tubular dam gate 102 (FIGURE 5) regulates flow of granule for the stripe 32 to the nozzle 106. To provide uniform discharge, the customary vibrator 104 is provided to act on the dispensing nozzle 106.

To prevent vertical vibration or oscillation of the web 30, and to produce accurate delineation of the stripes 32 on the web 30, a web-supporting roller 108 is suitably mounted to the framing 48 of the machine in such manner so as to provide close disposition of the dispensed granules 32 upon the coated web in a predetermined position.

The width of the stripe is controlled by suitable sideboards on the nozzle that are adjustably movable in relation to each other and are conventionally used for this purpose in this art.

As previously described the sensing unit responds to the disposition of the edge of the web 30 within the space or opening 52 in the head. As the edge of the web 30 weaves to and fro transversely it actuates the piston 110 in the cylinder 72. One end 112 of the power cylinder 72 is pivotably attached to the support column 116 depending from the transverse section of the framing 76. The other end or piston rod 114 is pivotally affixed to the lowermost portion of the carrier arm 82, which as mentioned previously is suspended pivotally about the shaft 80 engaged within the journal held by holder 78. Thus, when the piston 114 within the cylinder 72 is motivated the entire assembly supported on carrier arms 82 and 82a swings through a slight barely perceptible arc X—X (see FIGURE 6) about the shaft 80 under the guidance and in response to the sensing unit influence. Accordingly, all the nozzle assemblies 92 mounted on the crossbar 88, move with the web, remain in substantial parallelism to the edge of the web 30 and deposit the granules in parallel juxtaposition to form the stripes of colored granules in contact with the coated web.

Obviously the number and disposition of the granule-applying stripe nozzle on the transverse bar 88 can be varied to meet the requirements of the final product. Likewise, the width of the stripes can be adjusted as desired. Though the illustrated form of the transverse bar 88 consisting of two V-channels placed in a facing relationship is preferred because of simplicity, low cost and adaptability, nevertheless other types can be used or substituted as required without departing from the fundamentals underlying this invention.

*Assembly B—Field granule applicator*

Assembly B which comprises the elements that may apply the colored granules used on the head as well as the butt portions of the shingle operate in combination with assembly A, for it is very essential that all granules be applied in exact stripe or boundary register, and in parallel relationship to themselves and to the edge of the web. However, in the present disclosure, assembly B applies granules to the butt portion only.

Assembly B (FIGURES 3 and 4) comprises a supporting frame 150 having sides 152, 152a and ends 154 and 154a. Extending from the outer walls of the ends 154 and 154a are bosses or trunnion-like projections 156 which serve as shafts for the hangers 158 (see FIGURE 1) while hangers 160 depend in an offset degree from the square shaft 170. Hangers 158 are suspended from a shaft round 162 about which they pivot or oscillate whenever the frame 150 is moved through an arc Y—Y (FIGURE 6). The shaft 162 is journaled in the support arm 164 that is fixed to the longitudinal framing members 166 that support the field granule applicator assembly. These in turn are supported by upright channels 168 affixed to machine support framing 48.

The hangers 160, as well as the support arm 162 for the hangers 158 are offset at their ends to permit the framing assembly 150 for the applicator to swing through the desired arc Y—Y.

The hanger arms 160 at their upper terminal ends are journaled about a driver rod or shaft 170 which is driven indirectly by the cylinder 72. The driver shaft 170 is supported in a somewhat similar fashion as the arms 164, by a longitudinal beam 166 which supports the journal-bearing holders 172 in which the driver shaft 170 is journaled.

The end 174 of the driver shaft 170 supports pivotally a depending arm 176 (see FIGURE 18) which at its lower end is connected by means of a pivoted link 178 to the lower end 180 of an extension which is an integral part of the arm 82a from which the stripe-dispensing assembly is supported. Since arms 82a and 180 are in a perpendicular alignment and arm 176 is also supported in a perpendicular alignment, therefore, arms 176 and 180 are parallel and any movement from the perpendicular is communicated to the other arm by means of the link 178.

The degree of swing of arc Y—Y of granule-dispensing frame carrier 150 must therefor correspond to the degree of the swing of the arc X—X on the stripe-dispensing granule applicator to obtain a parallel registry but being somewhat wider since it is farther away from the pivoting center. To obtain this parallel registry there is provided a locking arrangement 182 which comprises a split bracket bearing block 184 which can be tightened about the end 174 of the driver shaft 170 by means of bolt 186 engaged by threads (not shown) in the split sections of the bracket block 184. Two arms 188 and 190 extend in the same parallel horizontal plane transversely from the lower end of the split block bearing 184 in a manner as to embrace the arm 176. Two sets of adjustable lock nut and bolt means 192 are provided to permit any adjustments and also to compensate for any fluttering that may occur in the cylinder 72 or in the sensing unit.

Thus whenever the transverse rod 88 supporting the stripe-granule dispensing hopper assemblies 92 is moved by the power cylinder 72 in response to the influence of the sensing unit, the arm 82a is also actuated, swinging through the arc X—X (FIGURE 6). Since parallel arms 176 and 180 are interconnected by the link arm 178, they will in turn rotate the driver shaft 170, whose motion will be transmitted to the supporting frame 150. The lever arm 160 is slightly longer than the arm 82a and therefore a certain amount of desirable overlapping by the field (in this instance butt portion) granules will take place over the already applied stripe granules. The stripe granules, of course, prevent the adhesion of the field granules to the already granule covered areas of the coated web, and therefore the excess of field granules are quite easily recovered in the third stage of this combination described as assembly C.

The carrier or assembly frame 150 supports the field granule distribution arrangement 206 (FIGURES 3, 4, 5, 7 and 8). It is so adapted as to permit the granules to drop onto the asphalt-coated web in register with the area between the applied granule stripe. The granules are fed from hoppers 194 by means of tubes 196 to the distribution bins 198. The flow of granules from the bins 198 is controlled by means of granule flow dividers 200 (FIGURE 5) that permit the granules to fall on the surface of rotating rollers 202. These are suitably supported by bearings 204 affixed to the framing of the machine. The usual drive means such as sprocket and chain are used with the rollers.

The granules fall onto the field granule distribution device 206 which comprises a rectangular framing having sides 208 and 208a and ends 210 and 210a. Disposed between the ends 210 and 210a in a longitudinal and parallel relationship to the sides 208 and 208a thereof are a series of deflectors 212 and 214. As best seen in the enlarged detail (FIGURE 8) the granules rain from confined portions of the distribution bin 198 as divided by the flow dividers 200 onto the surface of the roller 202. The roller 202 provides a uniform distribution and flow of the granules onto the desired portion of the striped web 30. However, since the web 30 is laterally shifting because of its inherent nature, the fall of the granules will not be in exact register. To overcome this condition provision is made to maintain register of assembly B with assembly A by means of the connecting linkage and driver shaft 170. The carrier-supporting frame 150 shifts its position in accordance with the shift laterally of the web 30, under the influence of the sensing head and power cylinder 72. Accordingly, the fall of the granules as they leave the roll 202 is deflected particularly along the edges thereof, so that the falling granules always are in contact with the edges of the stripe. Thus the entire area is always covered by the granules in the desired portion of the shingle strip.

The deflector 212 or 214 of the field granule distributor may be of several types and have preselected spacings between them. If more than one blend of colored granules are used, then a series of deflectors can be provided within the framing 206. Several of these may be on hand and are easily changed even while the machine is in operation. These are particularly useful when the striping nozzles are relocated. This arrangement provides for a quick, easy and inexpensive change-over from one dimensioned style of shingle to another.

*Assembly C—Recovery of excess granules*

In order to perform effectively and provide complete coverage of the asphalt-coated sheet, it is necessary that an excess of granules be used. After embedment the excess should be recovered for reuse. As indicated hereinabove, different grades of granules or materials may be employed for the lap, butt or stripe portions of the shingle. Some of these, particularly certain granules synthetically colored and produced, are relatively expensive in comparison to those used in the head lap portion. Economic compulsion requires recovery of such granules.

The principles underlying this invention are particularly adapted to the recovery of unused portions of granules, since it is entirely possible to recover said granules not only by color but also by grade, with very slight loss due to intermingling.

It should be noted that the distance from the point of stripe granule application to the point where the nip of the embedding rollers takes effect is relatively great and to some extent permits differences in stretch to occur within the web. Accordingly it has a tendency to weave laterally by the time a definite section of the web with the definite stripe granule thereon comes within the sphere of influence of the granule recovery assembly C. As a result of these vagaries in the web action, it is desirable that an independent sensing head be used in the recovery unit though it is possible if conditions of operations are satisfactory to operate with only one unit for assemblies A, B and C.

As previously stated, the stripe granules are applied first, then the more expensive and colorful granules are applied to butt or exposed portion which in the present operation is distributed evenly and in register by assembly B. Finally, the least expensive, generally slate granules, are applied to the head lap or concealed portion of the strip shingle. The latter are applied just before the nip of the embedding roll.

The recovery assembly is illustrated in FIGURES 1, 3, 4, 5, 9, 10, 11, 12, 13 and 19. It comprises a sensing unit 250 (FIGURES 10 and 19) similar to one described hereinabove. It is mounted on a rod 252 frictionally retained in the clamp 262 by means of nuts and bolts 254. In this clamp 262 it is vertically adjustable within a slot 256 formed medially in the lower end of a bracket arm 258 affixed to the framing. The rod 252 is threaded and has thereon a knurled nut 260 by which the position of the sensing head 250 is accurately controlled in relation to the edge of the web 30. The usual tubing leading from the sensing head 250 to the power cylinder 264 for sake of clarity, has been omitted. One end 266 of the said cylinder 264 is attached pivotally to the framing 166. The other or the piston end 268 is attached pivotally to a dependent bracket arm 270 attached to a slidable rod 272 whose ends are supported within bearing pillow blocks 274 affixed to the framing member 166. As the rod 272 moves laterally to and fro in response to the motion of the piston end 268 it carries all attachments that may be associated with it in complete register with the edge of web 30 which is riding through sensing unit 250. To prevent grit and dirt from entering the bearing blocks 274 there are provided dust covers 276 adjacent each end of the shaft or rod 272.

Attached transversely to the entire length of the rod 272 is a swingable wall 278 (FIGURE 9) which with its inturned side ends 282 and 284 abut in a swingable slidable relationship with the sides 286 and 288. The lowermost edge 280 of the wall 278 terminates near the periphery of the granule distribution roll 290. A transverse dam gate 292 (FIGURE 9) suitably attached in a vertical slidable relationship has an adjustable opening between it and the roll 290 which is controlled by a rack and pinion gear arrangement 294. A shaft 296 (FIGURE 10) journaled on its ends, extends beyond one of its journal blocks and has thereon an indexing control hand wheel (not shown) for convenient access to control the flow of granules. There is also provided on the forward upper portions of the side walls 286 and 288 extended bosses or guides 298 to maintain the said forward edge of the sides of the slate bin in vertical and parallel alignment as the entire slate bin moves. Thus the bin is bounded by the swingable wall 278, side walls 286 and 288, forward wall sloping wall 300 and the bottom or distribution roll 290.

Essentially the forward wall 300 (FIGURE 9) assembly is a rectangular plate 302 whose ends 304 are inwardly turned to frictionally engage in slidable relationship the inside surface of the end walls 286 and 288 of the bin. The lower edge 306 terminates at the periphery of the distribution roll 290. If desired it may have a flexible member 308 attached thereto to provide a better seal between the wall 302 and the roll 290 (FIGURE 13). Likewise, on the upper end 310 of the wall 300 near the take-off roll 312, a flexible edge 314 is provided to maintain a uniform pressure against the periphery of the take-off roll 312 and provide for an efficient sweeping action. To prevent possible jamming of the material at either edge 308 or 314, the plate 302 is pivotable about a shaft 316 (FIGURE 9). However, in case where stripe granule collecting take-off scoops are provided (FIGURE 13) those particular sections may have the lower portion of the wall tightly fastened to the shaft 316 by means of a ball and socket arrangement or as shown in the drawing a locked bearing and shaft arrangement 318.

It should be noted that movable partitions 320 (FIGURE 12) are provided to maintain separation within the slate-dispensing hopper. Though the back wall 278 and the forward wall assembly 300 is illustrated as one-piece constructions, it is entirely feasible to have only the back wall 278 of a one-piece construction while the front wall assembly 300 may consist of two or more sections each specially designed to act as an individual take-off scoop for a particular blend or kind of granules. It is also feasible to have the baffle plate dividers 320 extend between such sections of the front wall. Likewise, if desired, the back wall 278 may also be segmented and the divider plates 320 may extend beyond the wall 278. It is obvious that there are many variations but it is important to have the take-off unit act in concert with the web as the sensing unit actuates the power cylinder which moves the slidable rod 272 that carries the entire bin assembly.

As indicated previously, the stripe-forming granules and the butt-covering granules are generally more costly than the materials such as slate, normally used on the head lap portion. Accordingly, provision is made to collect each separately from the head lap material. However, for sake of simplicity, the drawings illustrate (FIGURE 12) that only the stripe material is recovered, while the balance of the butt material is permitted to fall into the slate hopper to become commingled with the slate granules and is utilized in covering the head lap portion of the shingles.

In order to recover the stripe material, a series of scoop assemblies 322 are provided. Essentially the scoop assembly 322 (FIGURE 13) comprises a rotatable head take-off 324 (FIGURE 17) and a scoop guide 326 to channelize the granules into the take-off. The guide 326 comprises an inverted U-shaped channel 328 whose lower edges 330 are curvilinearly shaped and adapted to fit partly over the granule take-off roll 312 and partly over the scoop head 324. Two threaded studs 332 are welded to the sides 334 to serve as shafts upon which are mounted one or more plows 336 (FIGURES 14 and 15) that force the granules to flow to the guide channel 326, which in turn forces the material to the take-off member 324. The plows 336 extend beyond the flexible edge 314 so that they rest on the surface of the roll 312. Though the plows 336 are generally mounted in pairs, it is at times desirable that only one be used to deflect the material to the proper section or division within the slate hopper or bin.

To the upper part of the inverted U-shaped member 326 is affixed a triangular bracket 348 whose upright section supports a rectangular hollow holder 350. The inside portion of this holder 350 is so designed as to fit snugly on the upstanding boss 352 extending from the top 354 of the take-off scoop 324. Thus the take-off guide 326 is firmly retained on the take-off scoop 324 and if necessary a cotter pin or the like 358 can be inserted through the hole 356 to lock the same firmly in position. The scoop comprises a tapered wall section consisting of an upper surface 354, two side walls 360 and a slanted floor 362 to facilitate elevation of material gathered by the collecting plows 336 into take-off 324. Under pressure the material continues to move within the confines of the scoop and finally drops through the opening 364 in the box portion 366. A similar opening 368 in coaxial alignment with the opening 364 is provided not only to act as an observation port but also for cleanout in case the opening 364 or the box 366 becomes jammed.

Forming an integral part of the scoop assembly 324 is a bearing rim 370 which rests on the top of a wall portion 372. This wall portion 372 is actually an extension of the forward wall 300 and joined thereto by means of shaft and bearing 374. Below the rim is a tube-like extension or spout 376 having an annular recess 378, in which, if desired, an expansion ring or retainer to hold the discharge spout tube 380 in position can be inserted. In order to lock the entire take-off spout in position, a retainer ring or gasket 382, preferably of rubberized material, is provided to contact the under surface of the wall portion 372 through which the spout 376 has been inserted. This retainer ring 382 prevents the spouts from turning and frictionally maintains them in position on the flexible top 314. The collected granules are discharged through the tube 380 to fall by gravity on a conveyor belt 384 which rides in the trough 386. To prevent bounce-offs, the sides of the conveyor trough 386 are provided with suitable deflection walls 388 and 390. The belt 384 discharges the recovered material to the proper bin for reuse.

In operation the assembly C or recovery section is actuated by the sensing head 250 which influences movement of the rod 272. All of the subassemblies are carried by this rod. As it moves laterally in concert with the web, the recovery spouts as well as the slate-distributing bin moves along with it. The slate fed from the overhead hopper 392 drops through the tubing into the compartments formed by partitions 320, swingable back wall 278, the forward wall 300 and the bottom with the distribution roll 290. As the roll 290 rotates in the direction of the arrow (FIGURE 5) the slate granules fall on the uncovered area of the moving web 30 which by now has portions covered with the strip granule material and the butt or exposed part granule materials. If desired, a masking shoe or guide 394 can be suspended from hangers 396 attached to the upper part of the walls 320 to prevent flow of granules to the roll 320. Thus the slate granules are required to fall only in register on the uncovered area of the asphalt-coated web. The now completely covered web 36 is forced against the roll 312 and its surface reversed as it is wound about roll 400. All loose granules that are not firmly embedded in the asphalt coating remain on the surface of the roll 312. The final roll on which the excess of granules are recovered is denoted by the numeral 400 while the active surface thereof on which the recovery action is taken is designated by the numeral 312. Contacting the full width of this roll 312, is the flexible tip 314 held between the plates forming the leading edge of the forward slate bin wall 300. If only one color is used, for instance, gray slate granules, then the excess of such granules fall into the bin and are reused directly. Any shortage is supplied by the feed from the spout 392.

However, if more than one color or quality is used, then the individual scoop assemblies 322 are employed to collect the desired material from the surface of the embedding roll 312, and forward it to the correct receiver by means of the conveyors. If three or more materials are to be recovered then a modification must be made to accommodate the extra material. However, all modifications come within the purview of the hereunto claims defining this invention.

Essentially, each assembly forming this combination can also act in its individual capacity, but since the piece of web is continuous, all assemblies must operate on the web and also cooperate with each other to accomplish this and attain the objectives set forth hereinabove.

I claim as my invention:

1. A machine for making coated roofing having a stripe design and for the recovery of excess granules used in the making thereof comprising a machine frame, a means on said frame for supporting a continuously moving linear web of coated sheeting, a means supported on said frame to deposit materials in a stripe pattern on said coated sheeting, a second means supported on said frame for depositing material to the areas not covered by said stripe pattern, a third means supported on said frame for collecting substantially separately the excess of materials deposited on the said stripe design and said areas, a means to index the position of the edge of said continuously moving linear web of coated sheeting and a means to simultaneously shift laterally the positions of said first means and of the said third means in register with each other and with the longitudinal edge of said continuous linear web of coated sheeting.

2. A machine for producing striped design roofing comprising a machine frame, a means on said frame for supporting a continuously moving linear web of coated sheeting, a means supported on said frame to deposit granule material in stripe pattern on said coated sheeting, means supported on said frame to deposit granule material to areas not covered by said stripe pattern granules, means to index the position of the edge of the said continuously moving linear web of coated sheeting, means to laterally shift the positions of said stripe-depositing means and of the said area-depositing means in register with the position of the edge of said continuously moving linear web, a second machine frame spaced apart from the said first machine frame, a second means on said second frame for supporting a continuously moving linear web of granule covered sheeting, a second means to index the position of the edge of a continuously moving linear web of granule covered sheeting, a means to recover unattached deposited granule materials from the granule covered sheeting supported on said second support on said second frame, and a means to laterally shift said granule recovery means in register with the edge of said granule covered sheet as directed by the said indexing means whereby the excess granules from said stripe design and from said areas not covered by the stripe design are collected substantially uncommingled in separate hoppers.

3. A machine for making roofing material of a stripe design comprising a machine frame, a means mounted on said frame adapted for supporting a continuously moving web of coated sheeting, a stripe granule-applying means mounted pivotally from said frame in a parallel relationship to said coated sheeting, a second granule-applying means mounted pivotally on said machine frame in a parallel relationship to said coated sheeting adapted to cover said coated sheeting with granules on areas other than the striped portion, a means connecting said stripe granule-applying means with said area granule-applying means adapted to move both simultaneously, a means to index the position of the edge of said continuously moving web of coated sheeting and a means connecting said index means with the said interconnected stripe and area granule-applying means whereby lateral movement of said moving web is transmitted to said interconnected stripe and area granule-applying means to maintain both in a vertical and longitudinal parallel alignment to the position of the edge of said transversely shifting moving web.

4. A machine for making roofing which comprises a machine frame, a support for a continuously moving adhesive-coated web of sheeting mounted on said machine frame, at least one granule applicator supported by said frame in a web-overlying position and adapted to apply granules of predetermined color in a stripe pattern upon said sheeting, an indexing means carried by said machine frame engaged in an edgewise relationship with said sheeting, a connecting means between said stripe applicator and said indexing means adapted for aligning said stripe applicator in an edgewise relationship with said sheeting whereby colored granules are deposited in a stripe at preselected linearly related position to the edge of said sheeting, a spill hopper mechanism operatively mounted on said frame in tandem with said stripe applicator adapted to deposit granules of another variety of said sheeting, an embedding roller to force granules into better contact with said adhesive-coated sheeting, a granule-recovery means mounted on said frame, a second indexing means adapted for aligning said granule-recovery means with the edge of the granule-embedded sheet to recover excess of the colored granules used to cover said adhesive-coated sheeting and a means for connecting said indexing means and said granule-recovery means whereby each color of said excess granules is recovered substantially unmingled and in a reusable condition.

5. A machine for making roofing having a stripe design thereon comprising a machine frame, a support for a continuously passing web of adhesively-coated sheeting mounted on said machine frame, at least one granule stripe applicator mounted on said frame overlying said continuously passing web of adhesively-coated sheeting, a pivoted linkage adapted to move said stripe applicator transversely in a parallel juxtaposition to the surface and edge of said passing web, an indexing means supported by said machine frame adjacent said stripe applicator engaged in an edgewise relationship with said passing web of adhesively-coated sheeting, a connecting means between said pivoted linkage adapted to move said stripe applicator and said indexing means whereby colored granules in a stripe design are deposited by said stripe applicator longitudinally upon said web in a substantially parallel position to the edge of the said adhesively-coated web, another granule spill hopper mechanism carried on a laterally pivotable frame, a laterally pivotable frame mounted in tandem on said machine frame beyond said stripe granule applicator, a second connecting means between said stripe granule applicator and said laterally pivotable frame adapted for transmitting motion initiated by said indexing means through the said first connecting means to the stripe applicator, thence through second connection means to said laterally pivotable frame supporting another granule spill hopper.

6. In a shingle-making machine the combination of a frame, a means on said frame for supporting a continuously moving web of adhesively-coated sheeting, an index means in juxtaposition with the edge of said sheet, a granule stripe applicator overlying said sheet to deposit in preselected areas thereon a stripe of granules, a connecting means between said granule stripe applicator and said index means whereby the said stripe applicator deposits granules in substantially parallel relationship to the edge of said sheet, another granule applicator overlying said sheet adapted to deposit granules on areas other than those striped, a second index means adjacent said other granule applicator mounted in juxtaposition with the edge of said sheeting, a second connecting means between said granule applicator and second indexing means whereby the position of said granule applicator is in substantially parallel relationship to the edge of said sheeting, an embedding roller overriding the completely granule-coated sheeting, a spill roller reversing the surface position of the completely granule-surfaced continuously moving web of said sheeting, a granule recovery means in juxtaposition with said spill roller, a connecting means between said granule-recovery means and a third index means, and a third index means adjacent said granule-recovery means whereby the loose excess granules are recovered and all operations are conducted in reference to the position of the longitudinal edge of the moving web.

7. In the combination of claim 6 wherein the said recovery means comprises at least one take-off chute adapted to remove excess granules from the said stripe-covered portion of said moving granule-covered sheet, a laterally movable support for said chute.

8. A machine for making roofing material having a stripe design, comprising a machine frame, means on said frame for supporting a continuously moving linear web of coated sheeting, stripe applying means supported on said frame for depositing granules in a stripe design on the coated sheeting, field applying means supported on said frame and including guide means in parallel register with said stripe applying means longitudinally of the web for depositing granules on areas of the sheeting not covered by the stripe granules, means to index the position of the edge of the continuously moving linear web of coated sheeting, and means connected to said index means for laterally shifting the positions of said stripe applying means and said field applying means to maintain the same in parallel register with each other and the edge of the web of coated sheeting, whereby the stripe granules and the field granules are applied to the web in parallel register with one another and the edge of the web.

9. A method of continuously producing roofing material having thereon at least one stripe parallel to the edge of the roofing sheet, comprising continuously passing a fibrous web through a saturant, applying an adherent coating to the saturated fibrous web, dispensing stripe forming granules over a preselected stripe area of the coated web, maintaining the stripe forming granules in parallel register with the edge of the web by guiding dispensing means therefor by the edge of the web, depositing other granules over the unstriped area of the web, maintaining said other granules in parallel register with the stripe forming granules and the edge of the web by guiding depositing means for the other granules by the edge of the web, imbedding the stripe forming and other granules in the coated web to facilitate adhesion thereof to the web, and individually collecting in substantially uncommingled condition the stripe forming and other granules not adhered to the web by guiding individual collecting means therefor by the edge of the web.

References Cited by the Examiner

UNITED STATES PATENTS

| | | | |
|---|---|---|---|
| 2,013,332 | 9/35 | Anderson. | |
| 2,160,787 | 5/39 | Reade | 118—310 X |
| 2,302,183 | 11/42 | Burns | 117—19 |
| 2,775,532 | 12/56 | Sallie et al | 118—308 X |
| 2,919,673 | 1/60 | Williams et al. | 118—8 |
| 2,977,924 | 4/61 | Bender et al. | 118—310 X |

RICHARD D. NEVIUS, *Primary Examiner.*

JOSEPH REBOLD, *Examiner.*